UNITED STATES PATENT OFFICE.

FREDERICK MARK BECKET, OF NIAGARA FALLS, NEW YORK, ASSIGNOR TO UNION CARBIDE COMPANY, OF NEW YORK, N. Y., A CORPORATION OF VIRGINIA.

MANUFACTURE OF CALCIUM CARBID.

1,310,465.     Specification of Letters Patent.     Patented July 22, 1919.

No Drawing.     Application filed August 15, 1917. Serial No. 186,391.

*To all whom it may concern:*

Be it known that I, FREDERICK M. BECKET, a subject of the King of Great Britain, residing at Niagara Falls, in the county of Niagara and State of New York, have invented certain new and useful Improvements in the Manufacture of Calcium Carbid, of which the following is a specification.

This invention relates to the manufacture of calcium carbid in the electric furnace, and comprises a process of preparing lime-carbon aggregates suitable for furnacing, and the aggregates thus prepared. The invention comprises also a process of making calcium carbid, said process being in its preferred embodiment continuous or semi-continuous in character.

In my prior United States Patent No. 1,137,567, I have described and claimed a process of preparing lime-carbon aggregates suitable for furnacing, this process comprising mixing the lime in proper proportions with a suitable coking coal, and coking the mixture. In my copending applications Serial Nos. 90,206 and 90,207, filed April 10, 1916, I have disclosed certain modifications of the above process whereby the same may be made continuous or semi-continuous, the coking of the mixture being carried out while in transit through a heating zone, stirring or agitation being avoided. According to application Serial No. 90,207, above mentioned, the coking coal is mixed with unburnt limestone, and the carbon dioxid is expelled in the course of the same heating operation which produces the aggregates.

According to the present invention, aggregates or briquets consisting essentially of lime and carbon in the proper carbid-forming proportions, may be prepared from non-coking carbonaceous materials, such as coke, wood charcoal, anthracite screenings or other anthracite coal, etc. Such aggregates may be prepared without the use, as a necessary adjunct, of any extraneous binder, although the use of a small proportion of an appropriate binder is not excluded, and may under some conditions be advantageous.

According to the present process the non-coking carbon is brought into sufficiently intimate admixture with hydrated lime, which is permitted to set or harden in presence of the carbon.

For example, I may prepare a dry mixture of carbon and burnt lime (CaO) in the proper carbid-forming proportions, and then hydrate the mixture: or the lime may be hydrated and the carbon introduced before the lime has set. In either case, the consistency of the mixture, as controlled by the proportion of water added, is preferably such as to allow it to be pugged and forced through dies, or otherwise shaped, as for example in a brick-press or machine, into briquets or lumps which however need not necessarily be regular or uniform in size. An extremely high degree of pressure is not necessary.

The carbid-forming reaction mentioned above requires theoretically about 36 parts by weight of carbon for every 56 parts of lime according to the well known equation—

$$CaO + 3C = CaC_2 + CO.$$

In practice it is customary, in addtiion to making the usual allowance for impurities in the raw materials, to provide some excess of carbon in the charge. For present purposes, a satisfactory mix may comprise, for example, 212 parts by weight of anthracite screenings (containing nine per cent. of ash) and 300 parts of burnt lime (95 per cent. CaO).

The screenings should be rather finely ground, preferably to about forty mesh, more or less. The lime is sufficiently ground to permit mixing with the screenings, say to about 6 to 10 mesh. After mixing, water is added in sufficient proportion to hydrate the lime and in sufficient excess thereof to convert the whole into a plastic mass suitable for pugging. It will of course be understood that in case the lime is hydrated previous to mixing with the carbon, the degree of subdivision of the lime is not material. The strength of the briquets is enhanced by all factors tending to greater intimacy of mixture of the components, and also by grinding or otherwise mechanically working the plastic mass before the pressing operation.

When the carbonaceous material employed is porous in character (coke, wood charcoal, etc.) such fine grinding as mentioned above is not necessary. In the case of anthracite, on the other hand, relatively fine grinding is necessary, or at least desirable in order to produce an aggregate or briquet having sufficient strength to stand under furnacing conditions.

The aggregates prepared by any of the methods above described may be hardened or cured by air-drying at normal or preferably somewhat higher temperatures. Under this treatment they have been found to increase progressively in hardness and strength for several days or even weeks, at the same time losing their original plasticity.

I prefer, however, for economical reasons connected with the subsequent smelting operation, to harden the briquets by heating them to a sufficient temperature and for a sufficient time to expel a large part, or even practically all, of the chemically combined water, in addition to expelling the water which is merely mechanically held. This may be accomplished at temperatures of 500°-600° C., but it is preferred to increase the temperature materially above this point, say to about 900° C. toward the end of the operation. In order to secure the best results as regards strength, hardness and durability of the briquets it is advisable to observe certain precautions in this heating stage. Thus, the briquets should be brought rather slowly to their maximum temperature, say over a period of one to two hours. Their strength is furthermore improved by subjecting the briquets to a hardening process at normal or slightly higher temperatures, as described above, before heating them to the higher temperature necessary for the expulsion of the combined water. Also, the heating should preferably take place under substantially non-oxidizing or reducing conditions; or at least in presence of the minimum practicable proportion of carbon dioxid in the flame or gases used for heating. The purpose of this is to avoid as far as practicable the absorption of carbon dioxid by the briquets during the heating stage, as well as the oxidation of the carbon component.

While it is not necessary to use an extraneous binder, such as sulfite pitch, molasses, tar or the like, in order to obtain strong and serviceable aggregates, small proportions of these or other binders may nevertheless be used without departing from my invention. Similarly, the briquets may be dipped in tar or other liquid in order to render them weather-proof.

In practice it is preferred to carry out the process of preparing the aggregates, as well as the process of making calcium carbid, in a continuous or semi-continuous manner, the several operations of burning the limestone, mixing with coke, hydrating the lime, briqueting or otherwise forming the aggregates, hardening the aggregates at normal or higher temperatures, and feeding them to the furnace, lending themselves readily to operations of this character. The carbid furnace preferably used is of the known type in which one or more vertical electrodes are embedded in the mass of briquets constituting the charge, the briqueting presenting the advantage among others of permitting a relatively free escape of the gases of reaction, and consequently permitting the electrodes to be comparatively deeply embedded in the charge and thereby protected from atmospheric oxidation.

I claim:—

1. In the manufacture of calcium carbid, a process of preparing aggregates suitable for furnacing, comprising compressing a plastic mixture consisting substantially of hydrated lime and non-coking carbon, the lime and carbon being in proper carbid-forming proportions, and subjecting the resulting aggregates to a hardening process.

2. In the manufacture of calcium carbid, a process of preparing aggregates suitable for furnacing, comprising compressing a plastic fixture consisting substantially of hydrated lime and non-coking carbon, the lime and carbon being in proper carbid-forming proportions, and subjecting the resulting aggregates to a hardening process by heating them to a sufficient temperature to expel chemically combined water.

3. In the manufacture of calcium carbid, a process of preparing aggregates suitable for furnacing, comprising compressing a plastic mixture consisting substantially of hydrated lime and non-coking carbon, the lime and carbon being in proper carbid-forming proportions, and subjecting the resulting aggregates to a hardening process by heating them under non-oxidizing conditions to a sufficient temperature to expel chemically combined water.

4. In the manufacture of calcium carbid, a process of preparing aggregates suitable for furnacing, comprising compressing a plastic mixture consisting substantially of hydrated lime and pulverized anthracite coal, the lime and coal being in proper carbid-forming proportions, and subjecting the resulting aggregates to a hardening process.

5. In the manufacture of calcium carbid, a process of preparing aggregates suitable for furnacing, comprising compressing a plastic mixture consisting substantially of hydrated lime and pulverized anthracite coal, the lime and coal being in proper carbid-forming proportions, and subjecting the resulting aggregates to a hardening process by heating them to a sufficient temperature to expel chemically combined water.

6. In the manufacture of calcium carbid, a process of preparing aggregates suitable for furnacing, comprising compressing a plastic mixture consisting substantially of hydrated lime and pulverized anthracite coal, the lime and coal being in proper carbid-forming proportions, and subjecting the resulting aggregates to a hardening process by heating them under non-oxidizing conditions to a sufficient temperature to expel chemically combined water.

7. A hard and non-plastic aggregate or briquet for calcium carbid manufacture consisting essentially of lime and carbon in proper carbid-forming proportions, said briquet having sufficient hardness and strength to endure furnacing.

8. A hard and non-plastic aggregate or briquet for calcium carbid manufacture consisting essentially of lime and pulverized anthracite coal in proper carbid-forming proportions, said briquet having sufficient hardness and strength to endure furnacing.

In testimony whereof, I affix my signature.

FREDERICK MARK BECKET.